Figure 1:
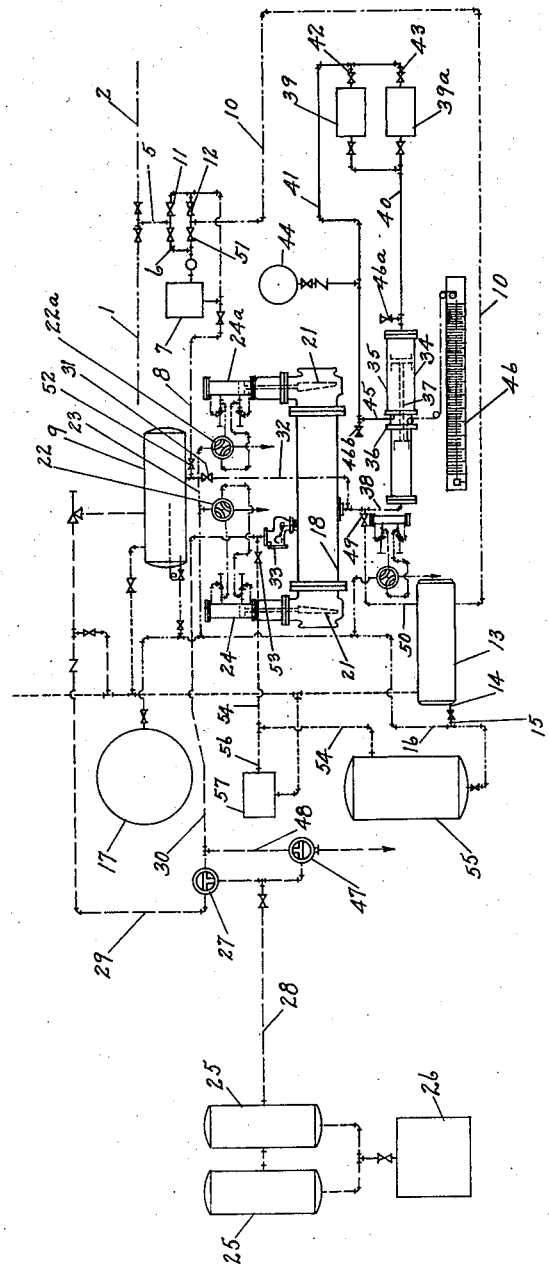

July 1, 1924.

G. B. SHIPLEY 1,499,791

PRESERVATIVE TREATMENT FOR TIMBERS

Filed Dec. 19, 1923    4 Sheets-Sheet 4

INVENTOR
Grant B. Shipley
by William B. Wharton
his attorney

Patented July 1, 1924.

1,499,791

UNITED STATES PATENT OFFICE.

GRANT B. SHIPLEY, OF PITTSBURGH, PENNSYLVANIA.

PRESERVATIVE TREATMENT FOR TIMBERS.

Application filed December 19, 1923. Serial No. 681,533.

*To all whom it may concern:*

Be it known that I, GRANT B. SHIPLEY, a citizen of the United States, residing at Pittsburgh, in the county of Allegheny and State of Pennsylvania, have invented a new and useful Improvement in Preservative Treatment for Timbers, of which the following is a specification.

This invention relates to a process for subjecting timbers, and particularly railway ties, to a preservative treatment.

As previously conducted, the treatment of ties has been a relatively long process; and it has therefore been necessary to employ large treating plants with installations capable of treating a large quantity of ties at a single charge. From such a plant the treated ties have been widely distributed to the points at which they are to be used.

While it is highly desirable to treat railway ties at points adjacent the place of their use, thus avoiding the hauling of ties for long distances, and while it is also desirable to utilize small, and relatively inexpensive, treating units small and movable treating units have heretofore proven unsuccessful in actual use. This is because of the relatively long duration of each treatment in a unit, which has rendered a small treating unit incapable of treating a sufficiently large number of ties within a short period of time.

The object of the invention is to provide a process of treating timbers, and particularly of treating railway ties, which so reduces the time of treatment that a small and compact unit, susceptible of movement from place to place, may be satisfactorily employed to rapidly treat a large number of ties at or near the point of their use.

The process of the present invention is based upon observation of the fact that there is a fixed relation between the time period and the pressure period in conducting a preservative treatment. It has thus been established that a preservative fluid may be forced into wood under extremely high pressures, provided that such pressures are instantaneously applied and that they are not held for any great length of time.

It is, therefore, the idea of the process to apply to the wood a pressure of preservative, which pressure is applied initially at its maximum, thus causing rapid and thorough penetration of the preservative into the intercellular spaces and fibres of the wood; and then to secure a quick rebound that causes the surplus preservative to be withdrawn from the wood cells, leaving the wood fibres coated, or painted, with preservative without injury to the fibres.

With this fundamental principle it is to be understood, however, that the degree of pressure must vary with the nature of the wood subjected to treatment. Thus red oak timbers may be subjected to a pressure of as high as two thousand pounds per square inch for a period of two and one-half minutes without injury to the wood fibres, whereas such pressure would injure the fibres of fir and certain other woods.

Figure 2:
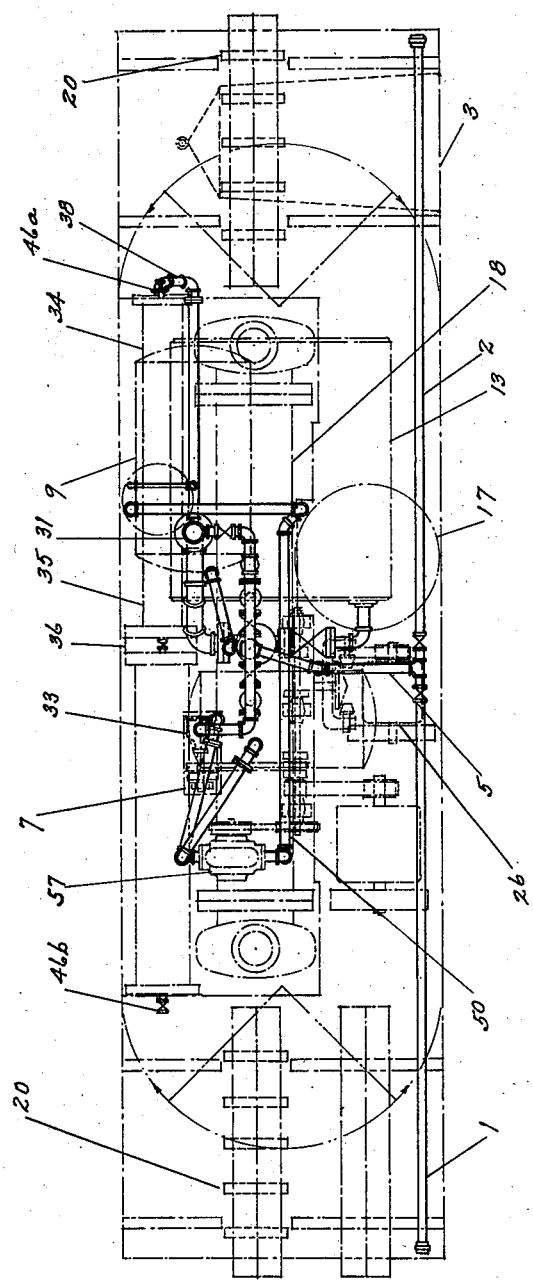
Figure 3:
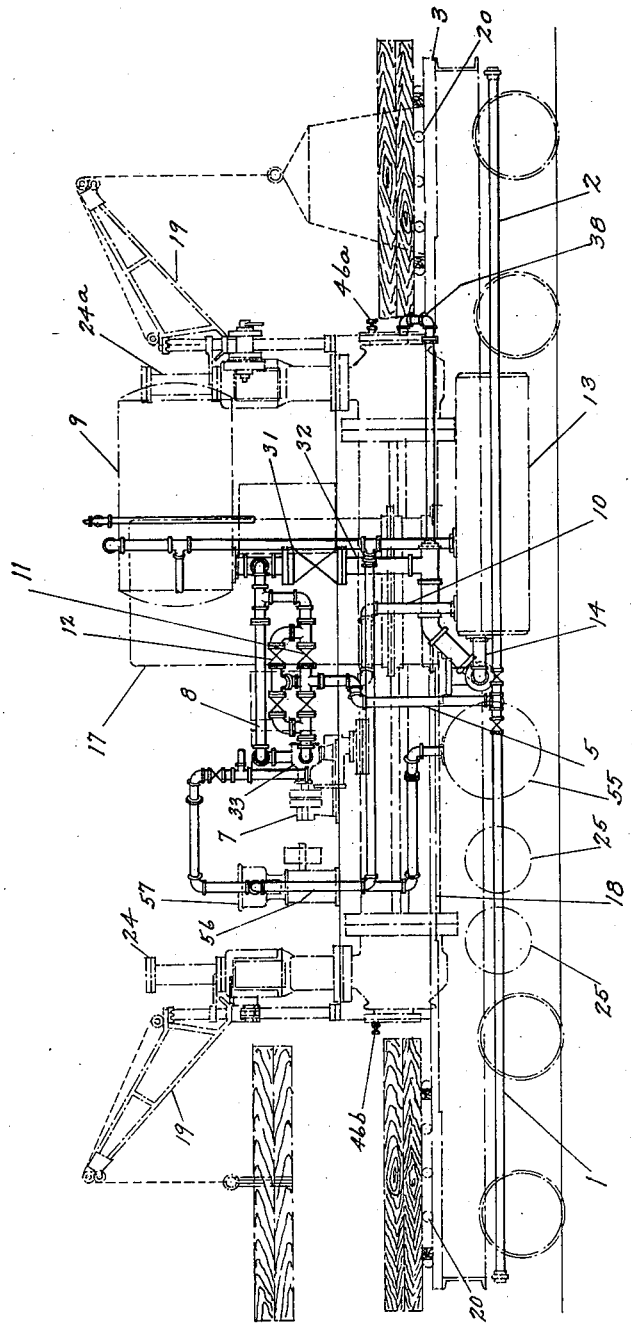
Figure 4:
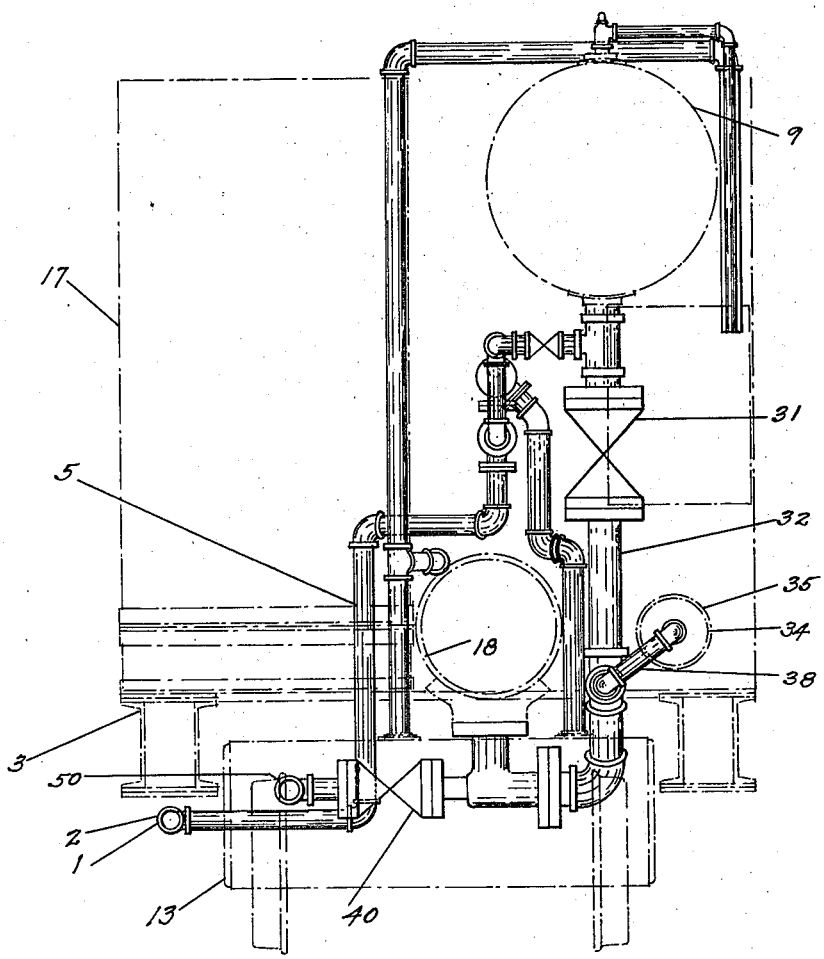

In the accompanying drawings Figure 1 is a diagrammatic plan view of an installation for conducting the process of the present invention; Figure 2 is a plan view of the installation mounted on a railway truck; Figure 3 is a side elevation of the apparatus shown in Figure 2; and Figure 4 is an end elevation thereof.

In conducting the process, creosote, or other suitable preservative fluid, is supplied by way of pipes 1 and 2 from tanks, which are not shown, mounted on flat cars at either end of the car 3 upon which the installation is mounted. This preservative fluid passes by way of branch pipe 5, valve 6 being open, to a transfer pump 7, from which it passes by way of a pipe 8 to the Rueping tank 9. It may also pass directly by way of branch pipes 5 and 10, valves 11 and 12 being open, to a sump tank 13.

Creosote in the Rueping tank 9 and sump tank 13 is heated by means of steam coils (not shown) which are connected by the valved branch pipes 14 and 15 respectively with the main steam line 16 leading from a boiler 17.

The treating cylinder 18 extends longitudinally of the flat car 3, and is charged from both ends by means of the small cranes 19 and live rolls 20.

When the cylinder has been charged from both ends thereof, the doors 21 of the treating cylinder are closed by opening steam cocks 22 and 22$^a$ to admit steam from the branch steam line 23 to the steam cylinders 24 and 24$^a$.

Air, which has been compressed in receivers 25 by an air compressor 26, is then admitted to Rueping tank 9 and treating cylinder 18 by operating air cock 27 to permit air to pass from the main air line 28 to the branch lines 29 and 30. The cock 27 is then turned to permit the air pressure in the Rueping tank and treating cylinder to become equalized.

The gate valve 31 in the line 32 leading from the Rueping tank to the treating cylinder is then opened, and the treating cylinder filled with the creosote or other preservative fluid. When the cylinder is filled the pipe 32 is closed by the operation of an automatic float valve 33.

At this stage of the process the creosote is forced into the cellular structure of the ties by subjecting the bath within the treating cylinder to pressure.

Such pressure is produced by an intensifier 34 and means for operating the same. The intensifier 34 comprises a cylinder 35 provided with a diaphragm 36 through which passes a plunger stem 37. On one side of diaphragm 36 cylinder 35 contains preservative fluid, and is in communication with treating cylinder 18 by way of pipe 38. On the other side of diaphragm 36 the cylinder 35 contains oil, and is in communication with gear pumps 39 and 39ª by way of pipe 40. The gear pumps 39 and 39ª are operated by any suitable means or connections, and connect by way of pipe 41 and branch pipes 42 and 43 with an oil supply tank 44. A branch pipe 45, passing through diaphragm 36 connects with the main oil pipe 41. The pumps 39 and 39ª are reversible, one being used as a discharge pump and the other as a suction pump to move the plunger of the intensifier in either direction in the cylinder 25. The movement of the plunger of intensifier 34, and the pressure under which the preservative is forced into the ties or timbers within the treating cylinder, may be observed on a calibrated gage board 46.

The pressure under which the preservative is forced into the treating cylinder may be regulated, or rather determined, by the operation of the vent valves 46ª and 46ᵇ in the oil supply pipe 40 and the branch oil pipe 41.

After preservative has been forced into the ties by the action of the intensifier, the exhaust cock 47 in air line 28 is operated to release air from the Rueping tank 9. With air cock 27 closed cutting off the main air line from the Rueping tank, cock 47 is operated to permit air to pass, by way of by-pass 48 and branch 30, to the treating cylinder. The gate valve 31 is then opened, and float valve 33 is also opened by the air pressure in branch pipe 30. The preservative fluid is thus forced out of the treating cylinder and back to the Rueping tank.

It should be understood that preservative may be also drawn off from the treating cylinder to the sump tank 13, by opening valve 49 in pipe 50, and thence returned to the Rueping tank by transfer pump 7. By reversing transfer pump 7, creosote may also be drawn off directly from the Rueping tank to the sump tank, valve 51, and the valve 52 in pipe 8, being open.

When the treating cylinder 18 has been emptied of creosote, the gate valve 31 is closed, and air cock 47 is opened to exhaust air from the cylinder. Cock 47 is then closed.

At this stage of the process the treating cylinder is empty and its interior is under atmospheric pressure. The ties in the treating cylinder are saturated with the creosote which has been forced into the pores of the wood, and contain an excess of the preservative.

The excess creosote in the ties is then exhausted by creating a vacuum in the interior of the cylinder. This may be effected by opening a cock 53 in the line 54 which leads to a vacuum tank 55. Vacuum is produced in this vacuum tank 55 by means of its connection with the steam line 16 and its connection by way of pipe 56 with a vacuum pump 57.

When the ties within the treating cylinder have been thus freed of surplus preservative, steam cocks 22 and 22ª are operated to open the doors of the treating cylinder, permitting air under atmospheric pressure to enter the cylinder. Simultaneously the valve 49 in the pipe 50 is opened to permit the surplus preservative withdrawn from the ties to flow into the sump tank.

The system is then ready for the insertion of a fresh charge, and the performance of a further, similar, operation.

It is mentioned above that the Rueping process, the Lowry process, and other preservative processes previously employed for treating railway ties are long processes conducted under a comparatively low pressure. Typical figures for processes of this nature may be given as an initial air treatment for from 30 to 45 minutes under a pressure of approximately 60 pounds per square inch; a preservative treatment for from 2 to 5 hours at a temperature of approximately one hundred eighty degrees Fahrenheit and with a pressure of approximately 175 to 200 pounds per square inch upon the preservative; and a vacuum treatment of approximately one hour under a vacuum of from 22 to 26 inches of mercury.

It will be noted that the pressure employed during such processes is relatively low, and that the timber is subjected to the preservative under pressure for a relatively great length of time. This low pressure has been employed for two reasons; one being that the large treating cylinders used are incapable of sustaining high pressures, because of their relatively great surface area; and the other being that a high pressure has been thought to produce material deterioration of timbers subjected to it.

The present process is conducted in a small cylinder, capable of sustaining a high pressure, and is so conducted that the period of treatment is relatively short. The steps of the process have been outlined generally above, and typical operating conditions under which these steps are performed will now be given.

The initial air supplied to the Rueping tank 9 and treating cylinder 18 is under a pressure of ninety pounds, or more, per square inch, and this air treatment is continued for approximately twenty seconds before introduction of creosote or other preservative to the treating cylinder from the Rueping tank. This transfer of preservative occupies a relatively short space of time, forty seconds being generally sufficient for filling the treating cylinders. It may be noted that the temperature of the preservative is preferably between 170° Fahrenheit and 180° Fahrenheit, thus closely approximating the temperature of the preservative bath employed in the Rueping and similar processes.

In forcing the preservative into the tie under the pressure supplied by the intensifier 34, such pressure is preferably between two hundred and fifty and two thousand pounds, or even more, per square inch, depending upon the nature of the wood undergoing treatment; and the time during which the ties are subjected to the pressure will vary from 30 seconds to 60 seconds, also depending upon the nature of the wood. This pressure serves to force from eight to twelve pounds, or more, of preservative per cubic foot of timber into the cellular structure of each of the ties undergoing treatment.

A large proportion of the preservative is then withdrawn from the body of each of the ties by subjecting them within the treating cylinder to the effect of a partial vacuum, which is preferably within the range of 22 to 26 inches of mercury. The ties are subjected to it for from 30 to 60 seconds; and from eight to twelve pounds, or more, of preservative per cubic foot is permitted to remain in the body of the timbers.

While only a comparatively small number of ties may be treated at a single charge in a small cylinder and under high pressure, it is found that the short period of time consumed in the treatment within the treating cylinder fully compensates for restricted capacity of the treating cylinder in effecting the treatment of a sufficiently great number of ties within a given period of time.

It is also a fact that the process of the present invention turns out ties which have not suffered a materially greater decrease in strength than those treated by means of the Rueping process, the Lowry process, and the other generally similar processes.

In the above connection the fact should be emphasized that the ties are subjected to a high pressure during a short period of time, the intensifier, or equivalent fluid pressure means, forcing the creosote into the structure of the wood with such rapidity that impregnation of the timbers by the preservative is nearly instantaneous.

The process noted above permits the use of small, compact, and movable treating units. It is thus possible to treat local supplies of timber to furnish railway ties, thus avoiding long hauls and repeated handling of the ties. It should also be noted that treating units capable of conducting the process of the present invention are inexpensive as compared with the large installations utilized in conducting the Rueping process, the Lowry process, and other generally similar processes.

It will be understood that the process is of great advantage in small stationary installations as well as in portable ones. In such case the advantages are those of increased economy in the initial cost of the installation and the treatment of the timbers.

As the apparatus illustrated and described herein is merely illustrative of a large number of alternative elements which may be utilized equally well in conducting the process, the scope of the invention is to be restricted only by the limitations contained in the claims appended hereto and in no wise to the apparatus as shown and described.

What I claim is:

1. The process of treating timbers preservatively which consists in subjecting the timbers to a preservative bath under a pressure in excess of two hundred and fifty pounds per square inch.

2. The process of treating timbers preservatively which consists in subjecting the timbers to a preservative bath under a pressure in excess of two hundred and fifty pounds per square inch for a period of time not in excess of five minutes.

3. The process of treating timbers preservatively which consists in subjecting the timbers to a preservative bath, and forcing the fluid of the bath into the body of the timbers under a high pressure produced by the stroke of a fluid pressure ram.

4. The process of treating timbers preservatively which consists in subjecting the timbers to a preservative bath, and forcing the fluid of the bath into the body of the timbers under a pressure in excess of two hundred and fifty pounds per square inch during the period of time occupied by the stroke of a fluid pressure ram producing such pressure.

5. The process of treating timbers preservatively which consists in subjecting the timbers to a preservative bath under a pressure in excess of two hundred and fifty pounds per square inch, releasing such pressure, and immediately withdrawing surplus preservative from the timbers by subjecting the same to the effect of a partial vacuum.

6. The process of treating timbers preservatively which consists in subjecting the timbers to a preservative bath under a pressure in excess of two hundred and fifty pounds per square inch for a period of time not in excess of five minutes, releasing such pressure, and immediately withdrawing surplus preservative from the timbers by subjecting the same to the effect of a partial vacuum.

7. The process of treating timbers preservatively which consists in subjecting the timbers to a preservative bath, forcing the fluid of the bath into the body of the timbers under a pressure in excess of two hundred and fifty pounds per square inch during the period of time occupied by the stroke of a fluid pressure ram producing such pressure, releasing such pressure, and immediately withdrawing surplus preservative from the timbers by subjecting the same to the effect of a partial vacuum.

8. The process of treating timbers preservatively which consists in subjecting the timbers to a preservative bath, forcing the fluid of the bath into the body of the timbers under a high pressure produced by the stroke of a fluid pressure ram producing such pressure, releasing such pressure, and immediately withdrawing surplus preservative from the timbers by subjecting the same to the effect of a partial vacuum.

9. The process of treating timbers preservatively which consists in subjecting the timbers to a preservative bath under a pressure of from two hundred and fifty pounds per square inch to two thousand pounds per square inch, and regulating the pressure within such limits in accordance with the nature of the wood undergoing treatment.

10. The process of treating timbers preservatively which consists in subjecting the timbers to a preservative bath under a pressure of from two hundred and fifty pounds per square inch to two thousand pounds per square inch for a period of time not in excess of five minutes, and regulating the pressure within such limits in accordance with the nature of the wood undergoing treatment.

11. The process of treating timbers preservatively which consists in subjecting the timbers to a preservative bath, forcing the fluid of the bath into the body of the timbers under a pressure of from two hundred and fifty pounds per square inch to two thousand pounds per square inch during the period of time occupied by the stroke of a fluid pressure ram producing such pressure, and regulating the pressure within such limits in accordance with the nature of the wood undergoing treatment.

12. The process of treating timbers preservatively which consists in subjecting the timbers to a preservative bath, forcing the fluid of the bath into the body of the timbers under a high pressure produced by the stroke of a fluid pressure ram, and regulating the pressure produced by the stroke of such ram in accordance with the nature of the wood undergoing treatment.

13. The process of treating timbers preservatively which consists in subjecting the timbers to a preservative bath under a pressure of from two hundred and fifty pounds per square inch to two thousand pounds per square inch, regulating the pressure within such limits in accordance with the nature of the wood undergoing treatment, releasing such pressure, and immediately withdrawing surplus preservative from the timbers by subjecting the same to a partial vacuum.

14. The process of treating timbers preservatively which consists in subjecting the timbers to a preservative bath under a pressure of from two hundred and fifty pounds per square inch to two thousand pounds per square inch for a period of time not in excess of five minutes, regulating such pressure in accordance with the nature of the wood undergoing treatment, releasing such pressure, and immediately withdrawing surplus preservative from the timbers by subjecting the same to the effect of a partial vacuum.

15. The process of treating timbers preservatively which consists in subjecting the timbers to a preservative bath, forcing the fluid of the bath into the body of the timbers under a pressure of from two hundred and fifty pounds per square inch to two thousand pounds per square inch during the period of time occupied by the stroke of a fluid pressure ram producing such pressure, regulating the pressure within such limits in accordance with the nature of the wood undergoing treatment, releasing such pressure, and immediately withdrawing surplus preservative from the timbers by subjecting the same to the effect of a partial vacuum.

16. The process of treating timbers preservatively which consists in subjecting the timbers to a preservative bath, forcing the fluid of the bath into the body of the timbers under a high pressure produced by the stroke of a fluid pressure ram, regulating the pressure produced by the stroke of such ram in accordance with the nature of the wood undergoing treatment, releasing such pressure, and immediately withdrawing surplus preservative from the timbers by subjecting the same to the effect of a partial vacuum.

17. The process of treating timbers preservatively which consists in subjecting the timbers to a preservative bath for a period of time not in excess of five minutes, and forcing the fluid of the bath into the body of the timbers under a high pressure produced by the stroke of a fluid pressure ram.

18. The process of treating timbers preservatively which consists in subjecting the timbers to a preservative bath for a period of time not in excess of five minutes, forcing the fluid of the bath into the body of the timbers under a high pressure produced by the stroke of a fluid pressure ram, releasing such pressure, and immediately withdrawing surplus preservative from the timbers by subjecting the same to the effect of a partial vacuum.

19. The process of treating timbers preservatively which consists in subjecting the timbers to a preservative bath for a period of time not in excess of five minutes, forcing the fluid of the bath into the body of the timbers under a high pressure produced by the stroke of a fluid pressure ram, and regulating the pressure produced by the stroke of such ram in accordance with the nature of the wood undergoing treatment.

20. The process of treating timbers preservatively which consists in subjecting the timbers to a preservative bath for a period of time not in excess of five minutes, forcing the fluid of the bath into the body of the timbers under a high pressure produced by the stroke of a fluid pressure ram, regulating the pressure produced by the stroke of such ram in accordance with the nature of the wood undergoing treatment, releasing such pressure, and immediately withdrawing surplus preservative from the timbers by subjecting the same to the effect of a partial vacuum.

In witness whereof, I hereunto set my hand.

GRANT B. SHIPLEY.

Witnesses:
B. K. ADAMS,
E. B. WALTERS.